United States Patent
Kim et al.

(10) Patent No.: US 12,198,298 B2
(45) Date of Patent: Jan. 14, 2025

(54) VIDEO PROCESSING METHOD AND APPARATUS

(71) Applicant: Korea Advanced Institute of Science and Technology, Yuseong-Gu (KR)

(72) Inventors: Mun Churl Kim, Daejeon (KR); Se Hwan Ki, Daejeon (KR)

(73) Assignee: Korea Advanced Institute of Science and Technology, Daejeon (KR)

(*) Notice: Subject to any disclaimer, the term of this patent is extended or adjusted under 35 U.S.C. 154(b) by 422 days.

(21) Appl. No.: 17/623,270

(22) PCT Filed: Jul. 3, 2020

(86) PCT No.: PCT/KR2020/008704
§ 371 (c)(1),
(2) Date: Dec. 28, 2021

(87) PCT Pub. No.: WO2021/002719
PCT Pub. Date: Jan. 7, 2021

(65) Prior Publication Data
US 2022/0366538 A1   Nov. 17, 2022

(30) Foreign Application Priority Data

Jul. 3, 2019 (KR) .................. 10-2019-0080363
Jul. 1, 2020 (KR) .................. 10-2020-0080914

(51) Int. Cl.
*G06T 5/00* (2024.01)
*G06T 3/4046* (2024.01)
(Continued)

(52) U.S. Cl.
CPC .............. *G06T 5/00* (2013.01); *G06T 3/4046* (2013.01); *G06T 3/4053* (2013.01); *G06T 7/11* (2017.01);
(Continued)

(58) Field of Classification Search
CPC ....... G06T 5/00; G06T 3/4046; G06T 3/4053; G06T 7/11; G06T 2207/10016;
(Continued)

(56) References Cited

U.S. PATENT DOCUMENTS 7,092,040 B1 * 8/2006 Watanabe ............ H04N 9/8227
348/700
10,771,807 B1 * 9/2020 Ulaganathan ........... G06F 17/15
(Continued)

FOREIGN PATENT DOCUMENTS

| CN | 109218727 | 1/2019 |
|---|---|---|
| JP | 4462922 | 5/2010 |

(Continued)

OTHER PUBLICATIONS

Elamaran et al., "Comparison of DCT and Wavelets in Image Coding", 2012 International Conference on Computer Communication and Informatics (ICCCI-2012), Jan. 10-12, 2012, Coimbatore, India (Year: 2012).*
(Continued)

*Primary Examiner* — Aaron W Carter

(57) ABSTRACT

Disclosed are a video processing method and a device therefor. The video processing method may include receiving a video comprising a plurality of temporal portions, receiving a first model parameter corresponding to a first neural network to process the video entirely, receiving residues between the first model parameter and a plurality of second model parameters corresponding to a plurality of second neural networks to process the plurality of temporal portions, and performing at least one of super-resolution, reverse or inverse tone mapping, tone mapping, frame interpolation, motion deblurring, denoising, and compression artifact removal on the video based on the residues.

24 Claims, 10 Drawing Sheets

(51) Int. Cl.
*G06T 3/4053* (2024.01)
*G06T 7/11* (2017.01)

(52) U.S. Cl.
CPC .............. *G06T 2207/10016* (2013.01); *G06T 2207/20081* (2013.01); *G06T 2207/20084* (2013.01)

(58) Field of Classification Search
CPC . G06T 2207/20081; G06T 2207/20084; G06T 9/00; G06T 5/80; G06T 5/73; G06N 3/04; G06N 3/08; G06N 3/045; H04N 19/597; H04N 19/86
See application file for complete search history.

(56) References Cited

U.S. PATENT DOCUMENTS

| | | | | |
|---|---|---|---|---|
| 10,958,869 | B1 * | 3/2021 | Chi ........................ | H04N 11/02 |
| 11,100,617 | B2 * | 8/2021 | Bazin ...................... | G06T 3/60 |
| 11,120,582 | B2 * | 9/2021 | Zhou ....................... | G06N 3/084 |
| 11,164,067 | B2 * | 11/2021 | Liang ..................... | G06V 10/764 |
| 11,240,492 | B2 * | 2/2022 | Zhai ....................... | H04N 19/172 |
| 11,449,966 | B2 * | 9/2022 | Su ............................ | G06T 5/20 |
| 11,501,473 | B2 * | 11/2022 | Zhang .................... | G06T 11/008 |
| 11,508,037 | B2 * | 11/2022 | Yang ...................... | G06N 3/045 |
| 11,651,526 | B2 * | 5/2023 | Fu ........................... | G06N 3/08 382/118 |
| 11,778,223 | B2 * | 10/2023 | Liu ........................ | H04N 19/184 375/240.15 |
| 11,830,167 | B2 * | 11/2023 | Gou ....................... | G06V 10/758 |
| 11,889,096 | B2 * | 1/2024 | Wang ..................... | H04N 19/59 |
| 2017/0351952 | A1 * | 12/2017 | Zhang ................... | G06V 10/764 |
| 2019/0098294 | A1 * | 3/2019 | Xu ......................... | H04N 19/186 |
| 2020/0236349 | A1 * | 7/2020 | Zhai ....................... | H04N 19/61 |
| 2021/0365780 | A1 * | 11/2021 | Liang ..................... | G06N 3/044 |
| 2022/0172452 | A1 * | 6/2022 | Wang ..................... | G06V 10/56 |
| 2022/0191473 | A1 * | 6/2022 | Zhai ....................... | H04N 19/147 |
| 2022/0366538 | A1 * | 11/2022 | Kim ........................ | G06N 3/04 |
| 2022/0392210 | A1 * | 12/2022 | Kim ........................ | G06N 3/09 |
| 2023/0325644 | A1 * | 10/2023 | Afrabandpey ........ | G06N 3/0495 |
| 2024/0048777 | A1 * | 2/2024 | Wang ..................... | H04N 19/59 |
| 2024/0144086 | A1 * | 5/2024 | Ahn ....................... | G06N 3/045 |

FOREIGN PATENT DOCUMENTS

| | | |
|---|---|---|
| JP | 2017-138808 | 8/2017 |
| KR | 10-2019-0067111 | 6/2019 |
| WO | WO 2021/002719 | 1/2021 |

OTHER PUBLICATIONS

Li et al., "Video Frame Interpolation Via Residue Refinement", IEEE (Year: 2020).*
International Search Report and the Written Opinion Dated Sep. 22, 2020 From the International Searching Authority Re. Application No. PCT/KR2020/008704 and Its Translation of Search Report Into English. (10 Pages).
Zhang et al. Residual Dense Network for Image Suprt-Resolution, ArXiv Preprint ArXiv: 1802.08797v1, p. 1-10, Feb. 24, 2018.

* cited by examiner

VIDEO PROCESSING METHOD AND APPARATUS

RELATED APPLICATIONS

This application is a National Phase of PCT Patent Application No. PCT/KR2020/008704 having International filing date of Jul. 3, 2020, which claims the benefit of priority of Korea Patent Application Nos. 10-2020-0080914 filed on Jul. 1, 2020 and 10-2019-0080363 filed on Jul. 3, 2019. The contents of the above applications are all incorporated by reference as if fully set forth herein in their entirety.

FIELD AND BACKGROUND OF THE INVENTION

The following description relates to a video processing method and device therefor.

A convolutional neural network (CNN) for super-resolution (SR) shows excellent performance with high fidelity in image restoration. Many studies have been conducted on CNN-based SR in the field of computer vision.

Through SR, it is possible to transmit a video efficiently encoded at a low spatial resolution and reconstructed to have high restoration fidelity at a high spatial resolution using a CNN-based SR method at a reception end.

In addition, SR performance may be enhanced to have higher restoring fidelity for content-adaptive training and transmission of a model parameter of a neural network. In this case, efficient transmission of a neural network parameter is essential.

SUMMARY OF THE INVENTION

Technical Goals

An aspect provides a video processing method.

Technical Solutions

According to an aspect, there is provided a video processing method including receiving a video including a plurality of temporal portions, receiving a first model parameter corresponding to a first neural network to process the video entirely, receiving residues between the first model parameter and a plurality of second model parameters corresponding to a plurality of second neural networks to process the plurality of temporal portions, and performing at least one of super-resolution, reverse or inverse tone mapping, tone mapping, frame interpolation, motion deblurring, denoising, and compression artifact removal on the video based on the residues.

At least one of the first neural network and the plurality of second neural networks may include a light-weight residual dense block including at least one convolutional layer.

At least one of the first neural network and the plurality of second neural networks may include a plurality of light-weight residual dense blocks configured in a cascade structure.

The light-weight residual dense block may include a depth-wise separable convolutional layer, or a 1×1×d convolutional layer.

The depth-wise separable convolutional layer may include a depth-wise convolutional layer, a point-wise convolutional layer, and a nonlinear activation function.

The performing may include restoring the plurality of second model parameters by adding the residues to the first model parameter, and performing at least one of super-resolution, reverse or inverse tone mapping, tone mapping, frame interpolation, motion deblurring, denoising and compression artifact removal on the plurality of temporal portions based on the plurality of second model parameters.

The video processing method may further include receiving spatial region splitting information on a frame included in the plurality of temporal portions and category information of split spatial regions.

The performing may include splitting the frame into a plurality of spatial regions based on the spatial region splitting information and the category information, and performing at least one of super-resolution, reverse or inverse tone mapping, tone mapping, frame interpolation, motion deblurring, denoising, and compression artifact removal on the video based on the plurality of spatial regions and the category information.

According to another aspect, there is provided a video processing device including a receiver configured to receive a video including a plurality of temporal portions, receive a first model parameter corresponding to a first neural network to process the video entirely, and receive residues between the first model parameter and a plurality of second model parameters corresponding to a plurality of second neural networks to process the plurality of temporal portions, and a processor configured to perform at least one of super-resolution, reverse or inverse tone mapping, tone mapping, frame interpolation, motion deblurring, denoising, and compression artifact removal on the video based on the residues.

At least one of the first neural network and the plurality of second neural networks may include a light-weight residual dense block including at least one convolutional layer.

At least one of the first neural network and the plurality of second neural networks may include a plurality of light-weight residual dense blocks configured in a cascade structure.

The light-weight residual dense block may include a depth-wise separable convolutional layer, or a 1×1×d convolutional layer.

The depth-wise separable convolutional layer may include a depth-wise convolutional layer, a point-wise convolutional layer, and a nonlinear activation function.

The processor may be configured to split a frame included in the video into a plurality of regions, restore the plurality of second model parameters by adding the residues to the first model parameter, and perform at least one of super-resolution, reverse or inverse tone mapping, tone mapping, frame interpolation, motion deblurring, denoising and compression artifact removal on the plurality of temporal portions based on the plurality of second model parameters.

The receiver may be further configured to receive spatial region splitting information on a frame included in the plurality of temporal portions and category information of split spatial regions.

The processor may be configured to split the frame into a plurality of spatial regions based on the spatial region splitting information and the category information, and perform at least one of super-resolution, reverse or inverse tone mapping, tone mapping, frame interpolation, motion deblurring, denoising, and compression artifact removal on the video based on the plurality of spatial regions and the category information.

According to another aspect, there is provided a video processing method of performing at least one of super-resolution, reverse or inverse tone mapping, tone mapping, frame interpolation, motion deblurring, denoising, and compression artifact removal, the video processing method including receiving a video including a plurality of temporal portions and model information related to neural networks configured to process the video, obtaining a first model parameter corresponding to a first neural network to process the video entirely based on the model information, obtaining a plurality of second model parameters corresponding to a plurality of second neural networks to process the plurality of temporal portions based on the model information, calculating residues between the first model parameter and the plurality of second model parameters, and transmitting the video and the residues.

The video processing method may further include generating spatial region splitting information by splitting a frame included in the plurality of temporal portions, and generating category information on the split spatial regions based on signal characteristics of the split spatial regions.

The transmitting may include compressing and transmitting at least one of the video, the residues, the spatial region splitting information and the category information.

The video processing method may further include training the plurality of second neural networks to minimize the residues.

According to another aspect, there is provided a video processing device of performing at least one of super-resolution, reverse or inverse tone mapping, tone mapping, frame interpolation, motion deblurring, denoising, and compression artifact removal, the video processing device including a receiver configured to receive a video including a plurality of temporal portions and model information related to a neural network configured to process the video, and a processor configured to obtain a first model parameter corresponding to a first neural network to process the video entirely based on the model information, obtain a plurality of second model parameters corresponding to a plurality of second neural networks to process the plurality of temporal portions based on the model information, calculate residues between the first model parameter and the plurality of second model parameters, and transmit the video and the residues.

The processor may be configured to generate spatial region splitting information by splitting a frame included in the plurality of temporal portions, and generate category information on split spatial regions based on signal characteristics of the split spatial regions.

The processor may be configured to compress and transmit at least one of the video, the residues, the spatial region splitting information and the category information.

The processor may be configured to train the plurality of second neural networks to minimize the residues.

DESCRIPTION OF SPECIFIC EMBODIMENTS OF THE INVENTION

Figure 1A:
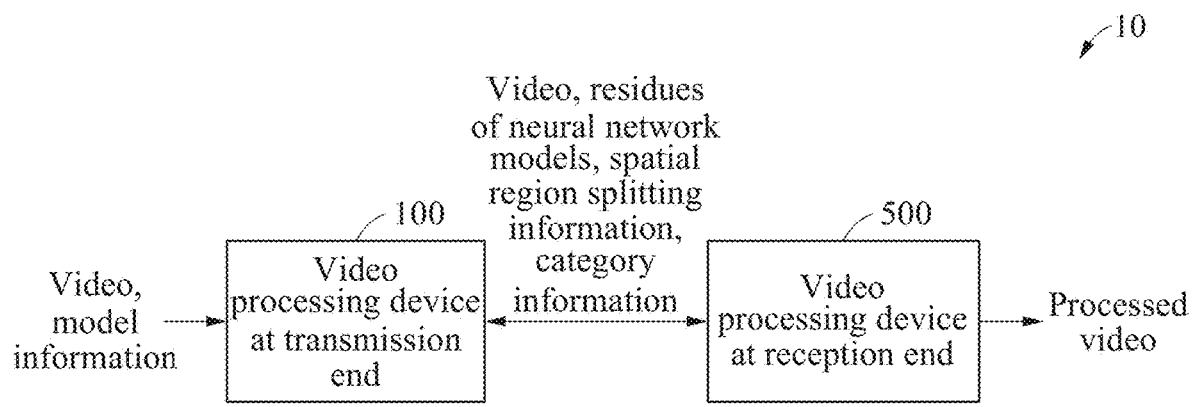
FIG. 1A is a block diagram illustrating a video processing system according to an example embodiment.

Hereinafter, example embodiments will be described in detail with reference to the accompanying drawings. However, various alterations and modifications may be made to the example embodiments. Here, the example embodiments are not construed as limited to the disclosure. The example embodiments should be understood to include all changes, equivalents, and replacements within the idea and the technical scope of the disclosure.

The terminology used herein is for the purpose of describing particular example embodiments only and is not to be limiting of the example embodiments. The singular forms "a", "an", and "the" are intended to include the plural forms as well, unless the context clearly indicates otherwise. It will be further understood that the terms "comprises/comprising" and/or "includes/including" when used herein, specify the presence of stated features, integers, steps, operations, elements, and/or components, but do not preclude the presence or addition of one or more other features, integers, steps, operations, elements, components and/or groups thereof.

Unless otherwise defined, all terms including technical and scientific terms used herein have the same meaning as commonly understood by one of ordinary skill in the art to which example embodiments belong. It will be further understood that terms, such as those defined in commonly-used dictionaries, should be interpreted as having a meaning that is consistent with their meaning in the context of the relevant art and will not be interpreted in an idealized or overly formal sense unless expressly so defined herein.

When describing the example embodiments with reference to the accompanying drawings, like reference numerals refer to like constituent elements and a repeated description related thereto will be omitted. In the description of example embodiments, detailed description of well-known related structures or functions will be omitted when it is deemed that such description will cause ambiguous interpretation of the present disclosure.

Also, in the description of the components, terms such as first, second, A, B, (a), (b) or the like may be used herein when describing components of the present disclosure. These terms are used only for the purpose of discriminating one constituent element from another constituent element, and the nature, the sequences, or the orders of the constituent elements are not limited by the terms. When one constituent element is described as being "connected", "coupled", or "attached" to another constituent element, it should be understood that one constituent element can be connected or attached directly to another constituent element, and an intervening constituent element can also be "connected", "coupled", or "attached" to the constituent elements.

The same name may be used to describe an element included in the example embodiments described above and an element having a common function. Unless otherwise mentioned, the descriptions on the example embodiments may be applicable to the following example embodiments and thus, duplicated descriptions will be omitted for conciseness.

Figure 1B:
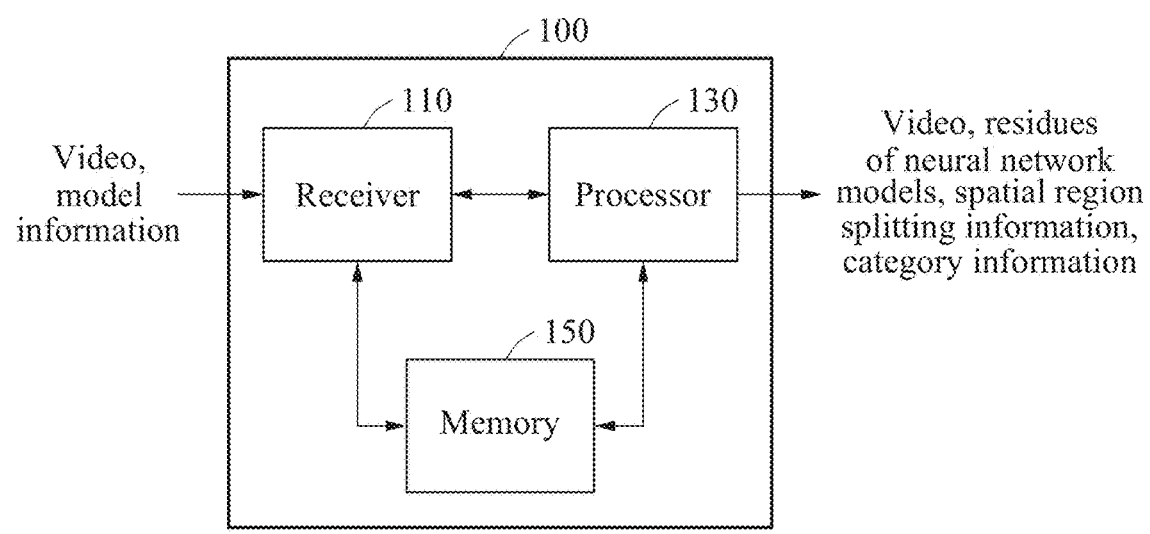
FIG. 1B is a block diagram illustrating a transmission end of a video processing device of FIG. 1.
Figure 1C:
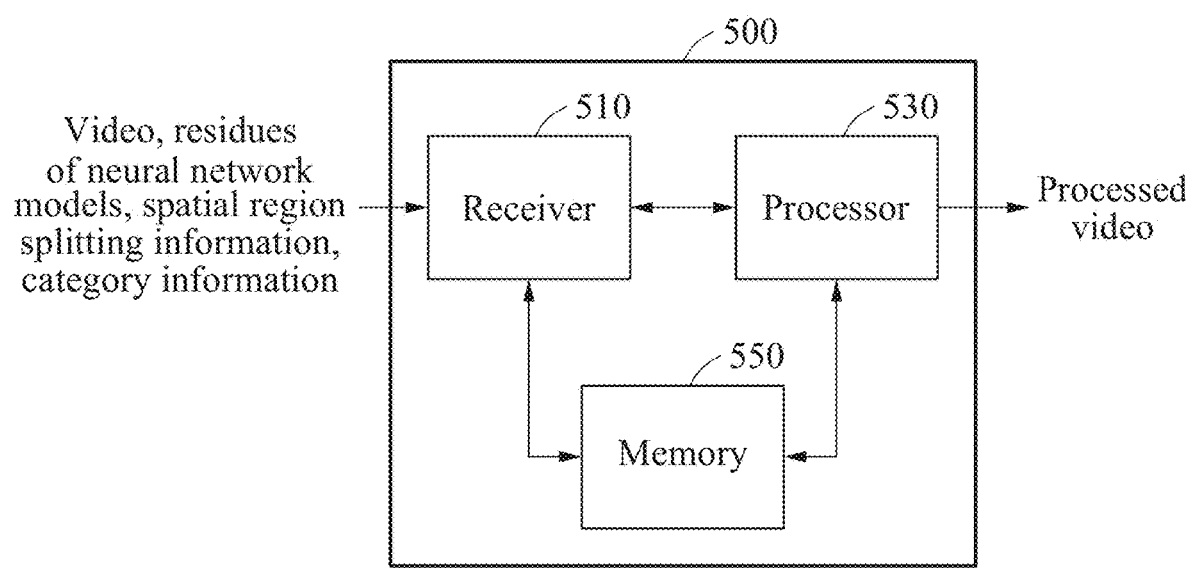
FIG. 1C is a block diagram illustrating a reception end of the video processing device of FIG. 1.

FIG. 1A is a block diagram illustrating a video processing system according to an example embodiment, FIG. 1B is a block diagram illustrating a transmission end of a video processing device of FIG. 1, and FIG. 1C is a block diagram illustrating a reception end of the video processing device of FIG. 1.

Referring to FIGS. 1A to 1C, a video processing system 10 may process an image or a video. The image includes an image of an object formed by refraction or reflection of light, and may represent a shape of an object using a line or a color. The video may include a frame. In addition, the frame may include a plurality of pixels.

The video may include a plurality of temporal portions. One temporal portion may correspond to one group of frames during a certain temporal duration, that is, may correspond to one video clip which is usually a part (a certain temporal duration) of a longer recording. In other words, the video may include multiple temporal durations in the flow of time.

The video processing system 10 may perform at least one of super-resolution, reverse or inverse tone mapping, tone mapping, frame interpolation, motion deblurring, denoising, and compression artifact removal on a video, a frame included in the video, or an image.

Super-resolution may refer to video processing that converts a low spatial resolution input image to a high spatial resolution input image. The video processing system 10 may perform super-resolution on a video, a frame included in the video, or an image using a neural network.

The neural network (or an artificial neural network) may include a statistical training algorithm that simulates biological neurons in machine learning and cognitive science. The neural network may be a general model that has the ability to solve a problem, where artificial neurons (nodes) forming the network through synaptic combinations change a connection strength of synapses through training.

The neural network may include a deep neural network (DNN). The neural network may include a convolutional neural network (CNN), a recurrent neural network (RNN), a perceptron, a feed forward (FF), a radial basis network (RBF), a deep feed forward (DFF), a long short-term memory (LSTM), a gated recurrent unit (GRU), an auto encoder (AE), a variational auto encoder (VAE), a denoising auto encoder (DAE), a sparse auto encoder (SAE), a Markov chain (MC), a Hopfield network (HN), a Boltzmann machine (BM), a restricted Boltzmann machine (RBM), a deep belief network (DBN), a deep convolutional network (DCN), a deconvolutional network (DN), a deep convolutional inverse graphics network (DCIGN), a generative adversarial network (GAN), a liquid state machine (LSM), an extreme learning machine (ELM), an echo state network (ESN), a deep residual network (DRN), a differentiable neural computer (DNC), a neural turning machine (NTM), a capsule network (CN), a Kohonen network (KN), and an attention network (AN).

The video processing system 10 may include a video processing device 100 at a transmission end (hereinafter, referred as to the video processing device 100) and a video processing device 500 at a reception end (hereinafter, referred as to the video processing device 500).

The video processing device 100 may process a video based on video and model information and may transmit a processing result to the video processing device 500. The processing result may include residues of a neural network model, spatial region splitting information of a frame included in the video and category information on split spatial regions to perform at least one of super-resolution, reverse or inverse tone mapping, frame interpolation, motion deblurring, denoising, and compression artifact removal based on the video and model information.

The model information may include information on a type and structure of a neural network and a model parameter of a pre-trained neural network.

That is, the video processing device 100 may generate and transmit residues of a neural network model, spatial region splitting information of a frame included in a video and category information on split spatial regions to the video processing device 500. In addition, the video processing device 100 may compress and transmit a video to the video processing device 500.

The video processing device 500 may process the video based on the processing result received from the video processing device 100. The video processing device 500 may perform at least one of super-resolution, reverse or inverse tone mapping, frame interpolation, motion deblurring, denoising, and compression artifact removal on a video based on residues of a neural network model, spatial region splitting information of a frame included in the video and category information on split spatial regions.

The video processing device 100 may train a neural network. The video processing device 100 may compress and transmit information on a trained neural network (for example, a model parameter of the neural network) to the video processing device 500. The information on the neural network may include a model parameter, a structure or a weight of the neural network. For example, the model parameter may include a filter parameter of a convolutional neural network.

The video processing device 100 may transmit information on a neural network model to a predetermined video processing device 500. The video processing device 500 may perform at least one of super-resolution, reverse or inverse tone mapping, tone mapping, frame interpolation, motion deblurring, denoising, and compression artifact removal based on the information on the neural network model.

The video processing device 100 may compress an image or a video. In addition, the video processing device 100 may transmit the compressed image or video to the video processing device 500. The video processing device 500 may perform at least one of super-resolution, reverse or inverse tone mapping, tone mapping, frame interpolation, motion deblurring, denoising, and compression artifact removal on an image or a video based on pre-stored information on a neural network or received information on the neural network.

The video processing device 100 may be provided at the transmission end. The video processing device 100 may be implemented at the transmission end, may save bandwidth by transmitting a video of reduced spatial and/or temporal resolution, and may perform at least one of super-resolution, reverse or inverse tone mapping, tone mapping, frame interpolation, motion deblurring, denoising, and compression artifact removal on the video with reduced resolution using the pre-stored information on the neural network in the reception end or the received information on the neural network.

As shown in FIGS. 1B and 1C, the video processing device 100 may include a receiver 110 and a processor 130, and the video processing device 500 may include a receiver 510 and a processor 530. The video processing device 100 may further include a memory 150 and the video processing device 500 may further include a memory 550.

The receiver 100 may receive an image, a video, or a frame included in the video, and model information to process the video. For example, the receiver 110 may receive a video including a plurality of temporal portions and model information related to a neural network to process the video. The receiver 110 may output the received image and/or video to the processor 130 and the memory 150.

The receiver 510 may receive a video including a plurality of temporal portions (or, a compressed video). The receiver 510 may receive residues between a first model parameter corresponding to a first neural network to process the entire video and a plurality of second model parameters corresponding to a plurality of second neural networks to process the first model parameter and the plurality of temporal portions respectively.

The receiver 510 may receive spatial region splitting information on a frame included in the plurality of temporal portions and category information of split spatial regions.

The receiver 510 may output the received video, the first model parameter, the residues, the spatial region splitting information and the category information to the processor 530 and the memory 550.

The processor 130 and the processor 530 may process data stored in the memory 150 and the memory 550 respectively. The processor 130 and the processor 530 may execute computer-readable code (for example, software) stored in the memory 150 and the memory 550 and instructions triggered by the processor 130 and the processor 530. The "processor 130 and the processor 530" may be data processing devices implemented by hardware including a circuit having a physical structure to perform desired operations. For example, the desired operations may include code or instructions included in a program.

For example, the hardware-implemented data processing device may include at least one of a microprocessor, a central processing unit (CPU), a processor core, a multi-core processor, a multiprocessor, an application-specific integrated circuit (ASIC), and a field-programmable gate array (FPGA).

The processor 130 may obtain the first model parameter corresponding to the first neural network to process the entire received video based on the model information. In other words, the first neural network may refer to a neural network which is trained for entire scenes.

In addition, the processor 130 may obtain the first model parameter from the first neural network for a purpose of processing all general videos, not limited to the received video. That is, the first neural network may refer to a neural network which is trained for general video scenes.

The processor 130 may obtain a plurality of second model parameters corresponding to a plurality of second neural networks to process the plurality of temporal portions based on the model information. A number of the plurality of temporal portions may be the same as a number of video clips, (each of which is usually a part a certain temporal duration of a longer recording), in a certain temporal duration of the video. Accordingly, a number of the second neural networks may be equal to or less than a number of the video clips included in the video. For example, when the number of second neural networks is less than the number of video clips, two or more video clips may correspond to one same second neural network model.

The processor 130 may train the first neural network and the plurality of second neural networks. The processor 130 may train the first neural network and the plurality of second neural networks to perform at least one of super-resolution, reverse or inverse tone mapping, tone mapping, frame interpolation, motion deblurring, denoising, and compression artifact removal on an image and/or a video based on a plurality of split spatial regions and residues between the first model parameter and the plurality of second model parameters.

The processor 130 may train the first neural network and the plurality of second neural networks using a predetermined loss function.

For example, the processor 130 may train the plurality of second neural networks to minimize the residues between the first model parameter and the plurality of second model parameters. The loss function will be described in detail with reference to FIG. 2.

At least one of the first neural network and the plurality of second neural networks may include a light-weight residual dense block (LwRDB) including at least one convolutional layer.

For example, at least one of the first neural network and the plurality of second neural networks may include a plurality of LwRDBs configured in a cascade structure.

A loss function of the first neural network may be determined based on a video on which at least one of super-resolution, reverse or inverse tone mapping, tone mapping, frame interpolation, motion deblurring, denoising, and compression artifact removal is performed. For example, the loss function of the first neural network may be an L1 loss between a ground truth frame and a frame on which at least one of super-resolution, reverse or inverse tone mapping, tone mapping, frame interpolation, motion deblurring, denoising, and compression artifact removal is performed.

The loss function of the second neural networks may include an L1 loss function between a ground truth frame and a frame on which super-resolution, reverse or inverse tone mapping, tone mapping, frame interpolation, motion deblurring, denoising, and compression artifact removal is performed for a corresponding temporal portion of the video and a loss function to minimize a difference between the plurality of second model parameters and the first neural network parameter based on the entire pre-trained video.

That is, the second model parameters of the second neural networks may be trained to minimize values of model residues to be transmitted while optimally performing at least one of super-resolution, reverse or inverse tone mapping, tone mapping, frame interpolation, motion deblurring, denoising, and compression artifact removal on corresponding temporal portions. The loss functions of the first neural network and the second neural networks will be described in detail with reference to FIG. 2.

A LwRDB may include a depth-wise separable convolutional layer or a 1×1×d convolutional layer. Here, d may represent a number of convolutional channels (or, feature maps) in a depth direction. The depth-wise separable convolutional layer may include a depth-wise convolutional layer, a point-wise convolutional layer, and a nonlinear activation function.

For example, the nonlinear activation function may include the functions rectified linear unit (ReLU), leaky ReLU, parametric ReLU, Softmax, Sigmoid, Tanh, exponential linear unit (ELU), and SoftPlus.

The processor 130 may calculate residues between the first model parameter and the plurality of second model parameters and may transmit a video and the residues. For example, the processor 130 may transmit a video and the residues to the video processing device 500.

The processor 130 may generate spatial region splitting information by splitting a frame included in the plurality of temporal portions. The spatial region splitting information may include information related to a split shape of the frame. For example, the spatial region splitting information may include widths, locations, and a number of split regions.

The processor 130 may generate category information of split spatial regions based on signal characteristics of the split spatial regions. For example, the processor 130 may split a plurality of regions based on image complexity of a plurality of split spatial regions and may determine categories of the plurality of split spatial regions. A process of generating category information will be described in detail with reference to FIG. 2.

The processor 130 may compress and transmit at least one of a video, residues, spatial region splitting information and category information. For example, the processor 130 may compress residues between the first model parameter and the plurality of second model parameters and may transmit the compressed residues. The processor 130 may transmit the compressed residues to the video processing device 500.

The processor 130 may compress and transmit spatial region splitting information on a plurality of spatial regions into which a frame is split and category information on categories of the plurality of spatial regions. For example, the processor 130 may compress and transmit spatial region splitting information and category information to the video processing device 500.

The processor 530 may perform at least one of super-resolution, reverse or inverse tone mapping, tone mapping, frame interpolation, motion deblurring, denoising, and compression artifact removal on an image and/or a video based on the residues between the first model parameter and the plurality of second model parameters.

The processor 530 may restore the plurality of second model parameters by adding the residues to the first model parameter. The processor 530 may perform at least one of super-resolution, reverse or inverse tone mapping, tone mapping, frame interpolation, motion deblurring, denoising, and compression artifact removal on the plurality of temporal portions based on the plurality of second model parameters.

The processor 530 may split the frame into a plurality of spatial regions based on the spatial region splitting information and category information. The processor 530 may perform at least one of super-resolution, reverse or inverse tone mapping, tone mapping, frame interpolation, motion deblurring, denoising, and compression artifact removal on a video based on a plurality of spatial regions and the category information.

The memory 150 and the memory 550 may store instructions (or programs) executable by the processor 130 and the processor 530. For example, the instructions may include instructions to perform operations of the processor 130 and the processor 530 and/or operations of each element of the processor 130 and the processor 530.

The memory 150 and the memory 550 may be implemented as a volatile memory device or a non-volatile memory device.

The volatile memory device may be implemented as a dynamic random-access memory (DRAM), a static random-access memory (SRAM), a thyristor RAM (T-RAM), a zero capacitor RAM (Z-RAM), or a twin transistor RAM (TTRAM).

The non-volatile memory device may be implemented as an electrically erasable programmable read-only memory (EEPROM), a flash memory, a magnetic RAM (MRAM), a spin-transfer torque (STT)-MRAM, a conductive bridging RAM (CBRAM), a ferroelectric RAM (FeRAM), a phase change RAM (PRAM), a resistive RAM (RRAM), a nanotube RRAM, a polymer RAM (PoRAM), a nano floating gate Memory (NFGM), a holographic memory, a molecular electronic memory device), or an insulator resistance change memory.

Figure 2:
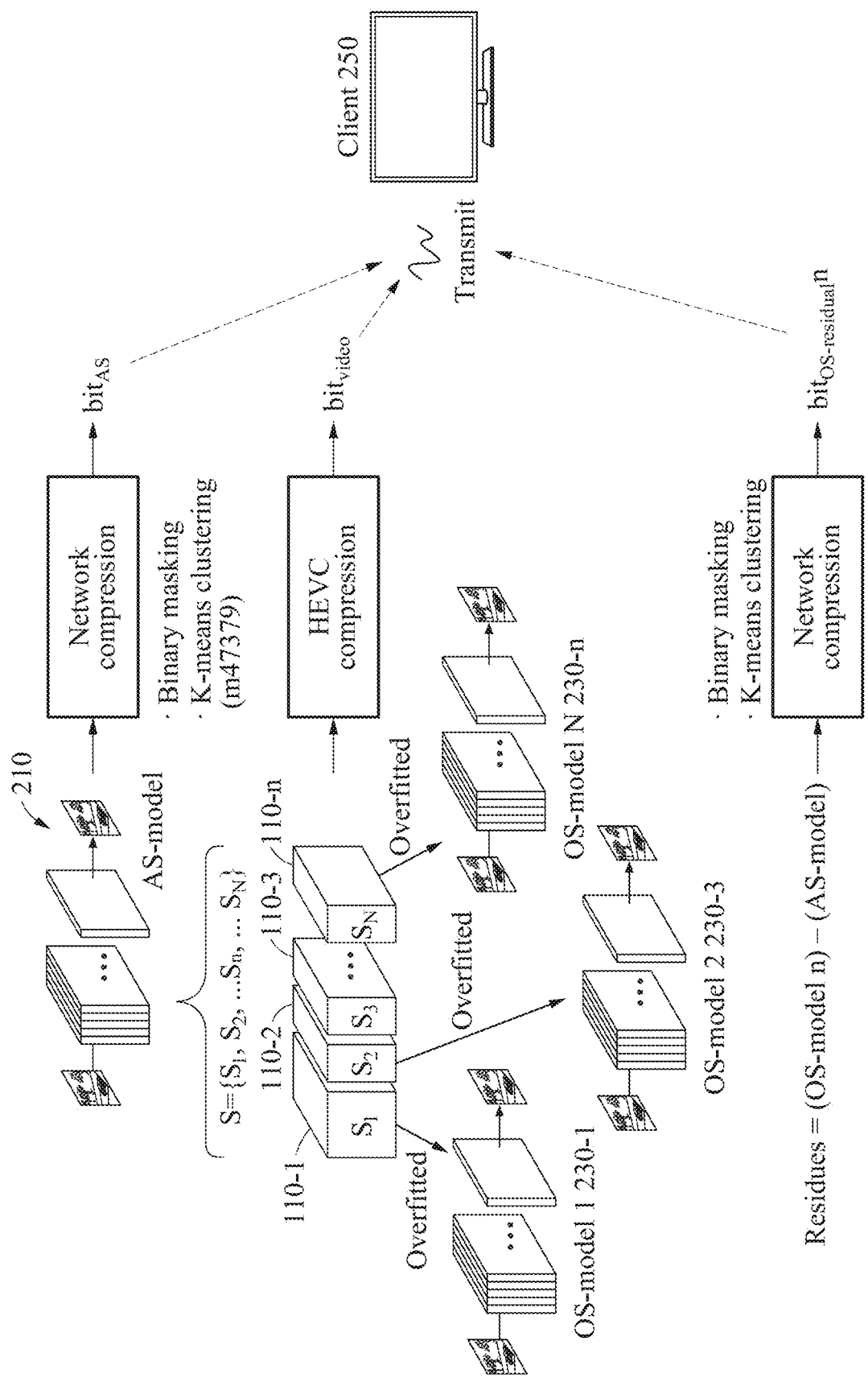
FIG. 2 illustrates an example of an operation of the transmission end of the video processing device of FIG. 1.

FIG. 2 illustrates an example of an operation of the transmission end of the video processing device of FIG. 1.

Referring to FIG. 2, the receiver 110 may receive a video including a plurality of temporal portions (or, a plurality of video clips) 110-1, 110-2, . . . 110-n. The processor 130 may process the received plurality of temporal portions 110-1, 110-2, . . . 110-n.

Specifically, the processor 130 may train a first neural network (or, an all-scene (AS) model) 210 and a plurality of second neural networks (for example, one-scene (OS) models) 230-1, 230-2, . . . , 230-n using the received video.

The processor 130 may train the first neural network 210 using the entire video. In other words, the processor 130 may update a model parameter of a neural network to minimize a loss function corresponding to the entire video to perform at least one of super-resolution, reverse or inverse tone mapping, tone mapping, frame interpolation, motion deblurring, denoising, and compression artifact removal by a client 250 on the entire video.

The processor 130 may minimize residues of a filter parameter and a loss of a video together by performing a compression on a model parameter of the neural network based on model parameter training of the neural network.

The residues of the filter parameter may be transferred to the video processing device 500 only for a video clip being considered, and this may be advantageous in an application field of image restoration in a receiver (for example, an user terminal) which has low complexity and limited calculation and storage resources. The client 250 may include the video processing device 500.

The processor 130 may perform transmission of the neural network which has been updated on at least one of temporal portions of the video. The processor 130 may use parameter residues between two neural network models to avoid overhead of neural network model parameters for temporal portions.

The first neural network 210 learned an entire video may be transmitted before transmitting the video and the second neural network models 230-1, 230-2, . . . , 230-n and learned temporal portions may be transmitted before the corresponding temporal portions of the video are transmitted.

Through this process, the processor 130 may train neural networks to effectively perform neural network-based image restoration (super-resolution, reverse or inverse tone mapping, tone mapping, frame interpolation, motion deblurring, denoising, and compression artifact removal). The processor 130 may transmit parameter residues between two neural network models to perform at least one of super-resolution, reverse or inverse tone mapping, tone mapping, frame interpolation, motion deblurring, denoising, and compression artifact removal by means of the client 250.

Here, the processor 130 may train one neural network model to be overfitted for the respective temporal portions and may train another neural network model to be overfitted for the entire video.

The processor 130 may train the second neural networks 230-1, 230-2, . . . , 230-n using the plurality of temporal portions (or, the plurality of scenes) 110-1, 110-2, . . . 110-n respectively.

For example, the processor 130 may train the second neural network 230-1 (or, an OS-model 1) using the first temporal portion 110-1 and may train the second neural network (or, an OS-model 2) using the second temporal portion 110-2. Similarly, the processor 130 may train the second neural network (or, OS-model n) using the nth temporal portion 100-n. Here, n may be an integer greater than or equal to 1.

Through this, the processor 130 may train the first neural network 210 to be overfitted for the entire video. The processor 130 may train the plurality of second neural networks 230-1, 230-2, . . . , 230-n to be overfitted to the plurality of temporal portions 110-1, 110-2, . . . , 110-n included in the video.

The second neural networks 230-1, 230-2, . . . , 230-n may be trained to minimize residues (or, residues of weights) between the first neural network 210 and the second neural networks 230-1, 230-2, . . . , 230-n.

The processor 130 may calculate the residues between the first neural network 210 and the plurality of second neural networks 230-1, 230-2, . . . , 230-n. As shown in FIG. 2, the processor 130 may calculate the residues by a difference between a model parameter of the second neural network 230-n (or, an OS-model n) and a model parameter of the first neural network (an AS-model) 210.

The processor 130 may compress and transmit a received video and information on the trained first neural network 210 and the trained second neural networks 230-1, 230-2, . . . , 230-n to the video processing device 500 or the client 250.

The processor 130 may compress information on the trained first neural network 210. For example, the processor 130 may compress a model parameter (or, a filter weight) of the trained first neural network 210 using binary masking and K-means clustering. The processor 130 may perform binary masking on zero weights and may perform K-means clustering on non-zero weights.

The processor 130 may transmit the compressed model parameter of the first neural network 210 to the video processing device 500 or the client 250. The processor 130 may compress and transmit a received video to the client 250. The processor 130 may transmit an encoded video bitstream. For example, the processor 130 may perform high efficiency video coding (HEVC) compression on a video and may transmit to the reception end or the client 250.

The processor 130 may perform compression on residues between the first neural network 210 and the plurality of second neural networks 230-1, 230-2, . . . , 230-n and may transmit to the video processing device 500 and the client 250. As described above, for the residues, the processor 130 may perform binary masking on zero weights and may perform K-means clustering on non-zero weights.

The processor 530 of the video processing device 500 may reconstruct received compressed model parameters. The received compressed model parameters may be residues (or residues of weights) corresponding to temporal portions before beginning of corresponding temporal portions.

The processor 530 may reconstruct model parameters of the second neural networks 230-1, 230-2, . . . , 230-n by adding residues (or, residues of weights) corresponding to decompressed temporal portions to a model parameter (or, a weight) which was received for the first time, of the first neural network.

The processor 530 may perform at least one of super-resolution, reverse or inverse tone mapping, tone mapping, frame interpolation, motion deblurring, denoising, and compression artifact removal using the second neural networks corresponding to temporal portions included in a video.

Hereinafter, a method of training the plurality of second neural networks 230-1, 230-2, . . . , 230-n and the first neural network 210 by the processor 130 will be described in detail.

The processor 130 may perform training a neural network in a content-adaptive manner to be overfitted to an entire video or a temporal portion of the video. Thereafter, the processor 130 may transmit a model parameter of the trained neural network.

As an example of a training dataset, the processor 130 may use a training sequence (or, a video) including 320 frames that include 10 different scenes. Each scene may include 32 frames. The training sequence may have 1920×1080@24 fps as a ground truth, and a low-resolution version may be generated by 2x downsampling. Here, encoding and decoding may be performed by HM 16.17 reference software.

A total loss function for training a neural network may include an super resolution (SR) loss and a weight residual (WR) cost. For example, the SR loss may be expressed by Equation 1.

$$L_{SR} = L1(\hat{x}, y)$$ [Equation 1]

Here, y may denote a ground truth frame, and $\hat{x}$ may denote a frame on which super-resolution is performed. In other words, the SR loss may represent an L1 loss function between the ground truth frame and the frame on which super-resolution is performed.

As an another example of Equation 1, a loss may be a loss corresponding to at least one of reverse or inverse tone mapping, tone mapping, frame interpolation, motion deblurring, denoising, and compression artifact removal which are other image restoration processes, instead of the SR loss.

The WR cost may be used for minimizing a residue of a weight (or, a model parameter) between a reference weight $W_{ref}$ which is pre-trained for an entire video sequence and $W_{train}$, a training weight for temporal portions.

The WR cost may be expressed by Equation 2.

$$C_{WR} = L1(W_{ref}, W_{train})$$ [Equation 2]

That is, the WR cost may denote an L1 loss function between a reference weight and a training weight. The first neural network (or, an AS model) 210 may include pre-trained reference weights for the entire sequence (or, the entire video).

When the first neural network 210 is trained, a total loss may be a loss corresponding to at least one of super-resolution, reverse or inverse tone mapping, tone mapping, frame interpolation, motion deblurring, denoising, and compression artifact removal. When the second neural networks (or, OS models) 230-1, 230-2, . . . , 230-n are trained for a plurality of temporal portions, a total loss may include the SR loss and the WR cost as Equation 3.

$$L_{total} = L_{SR} + \lambda C_{WR}$$ [Equation 3]

Here, λ may denote a hyperparameter and may be empirically determined. For a small λ value, for example, SR performance may be enhanced, however, weight compression performance may be degraded due to an increase in a WR cost. Conversely, for a large λ value, SR performance may be degraded, however, weight compression performance may be enhanced due to a decrease in a WR cost. For example, λ may be 0.003.

The processor 130 may train the first neural network 210 for all the video frames (for example, 320 frames). Here, random cropping may be partially used to overfit to training video data without using an extra augmentation method.

During training, an input patch size may be 60×60 and a batch size may be 2. The processor 130 may train the first neural network 210 up to 64,000 iterations, and here, a learning rate may be 0.001.

The processor 130 may train the plurality of second neural networks 230-1, 230-2, . . . , 230-n using frames (for example, 32 frames) of the plurality of temporal portions (or, scenes) 110-1, 110-2, . . . 110-n respectively. Here, a model parameter of the trained first neural network may be used as a reference weight.

Here, the first neural network 210 and the plurality of second neural networks 230-1, 230-2, . . . , 230-n may have the same structure and may be trained using different data. In training the second neural networks 230-1, 230-2, . . . , 230-n, an input patch size may be 400×400 and an initial model parameter of the second neural networks 230-1, 230-2, . . . , 230-n may be set as a model parameter of the pre-trained first neural network 210. Other than that, a training condition may be the same for the first neural network 210 and the second neural networks 230-1, 230-2, . . . , 230-n.

Figure 3:
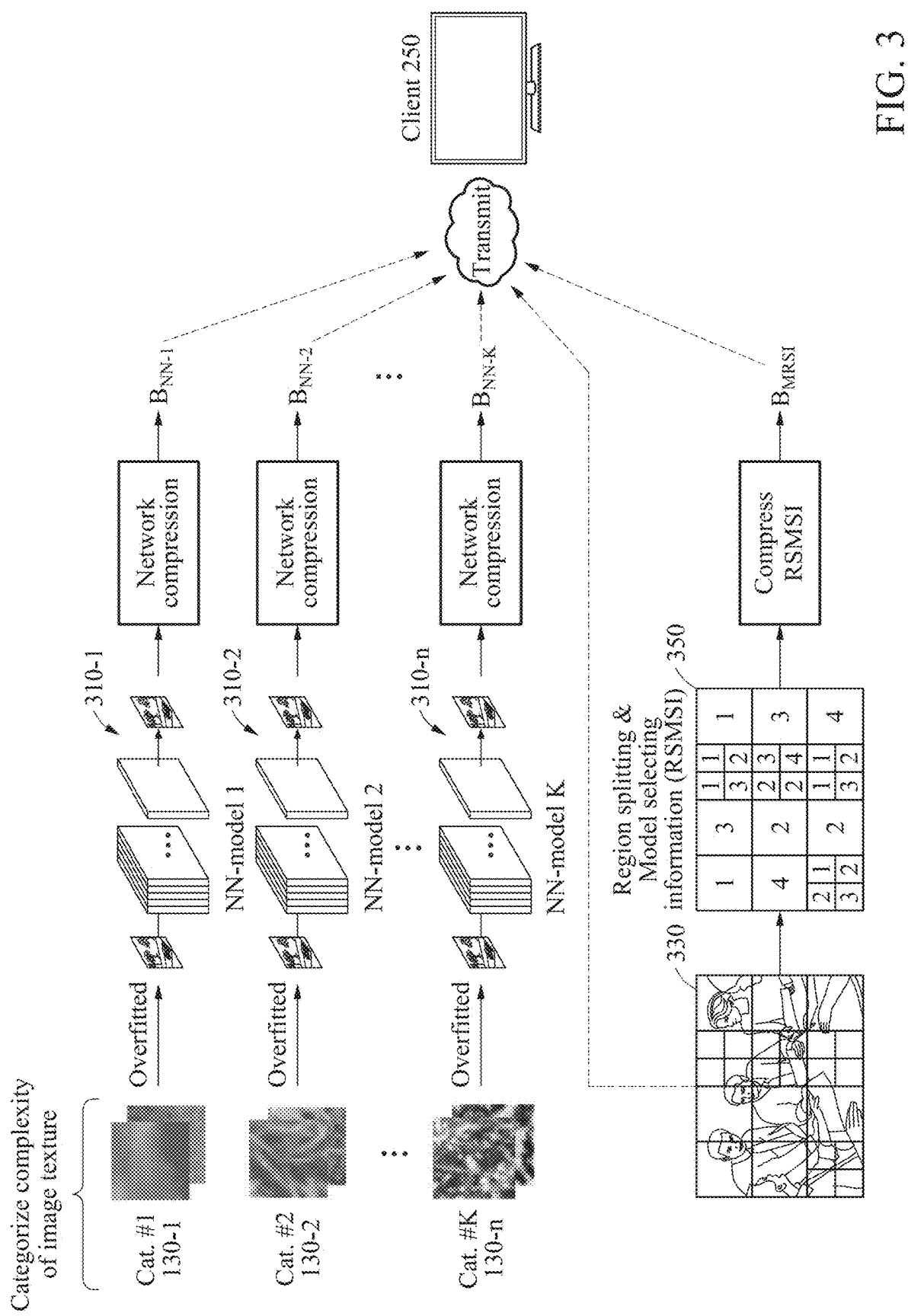
FIG. 3 illustrates another example of an operation of the transmission end of the video processing device of FIG. 1.

FIG. 3 illustrates another example of an operation of the transmission end of the video processing device of FIG. 1.

Referring to FIG. 3, the processor 130 may split a frame included in a video into a plurality of spatial regions and may perform super-resolution on the video based on the plurality of spatial regions. The processor 130 may enhance image restoration performance of the client 250 by splitting a frame into a plurality of spatial regions and allowing an image corresponding to a plurality of spatial regions to be processed using a neural network suitable for the plurality of spatial regions.

The client 250 may enhance image restoration performance using not only information on a neural network which has been updated on temporal portions of a received video, but also splitting information on spatial regions of frames of the temporal portions and received neural network models corresponding to the spatial regions.

A size of a single neural network may need to be large enough to achieve appropriate performance for quality enhancement and may need to be properly trained for a large quantity of training samples. Since a large scale neural network may require a complex operation and large storage to process inputs and generate outputs, it may be difficult to use in a user terminal which has a limited operation capability.

The processor 130 may more efficiently perform super-resolution by splitting frames included in temporal portions into appropriate spatial regions (or, a plurality of regions) and additionally using a plurality of neural networks to process a plurality of split regions respectively in the content-adaptive manner described in FIG. 2.

Here, the processor 130 may normatively define a signaling that identifies which neural network is applied to split spatial regions of a frame in a temporal portion of a video under service.

In addition, the processor 130 may normatively define a configuration representation of the neural networks which are applied to the split spatial regions in the corresponding frame in a combination of the above described signaling information.

For example, a neural network performing super-resolution may enhance a resolution by a predetermined factor (for example, a factor of 2). Here, the transmission end may downscale a video (or, content) by an inverse of the same factor (a factor of 1/2) and may transmit to the video processing device 500.

If the video processing device 500 already has a neural network, the processor 130 may transmit a type of the neural network or an actual weight and topology of the neural network The neural network may be dedicatedly trained or fined-tuned for content (for example, a video) to be transmitted. When neural networks are trained for temporal portions of a video respectively, each of the neural networks may be transmitted to the reception end before or while a corresponding video clip (a temporal portion) is being transmitted.

The processor 530 may perform at least one of super-resolution, reverse or inverse tone mapping, tone mapping, frame interpolation, motion deblurring, denoising, and compression artifact removal using corresponding neural networks on temporal portions of a video as well as spatial regions of a frame.

The processor 130 may determine a category of the plurality of spatial regions based on characteristics of the plurality of spatial regions into which a frame is split. Here, the plurality of spatial regions may represent regions of an image or regions of a frame. The processor 130 may enhance video processing performance using the plurality of neural networks which are trained for a group of images having a detailed category based on characteristics of the plurality of regions.

The processor 530 may enhance video processing performance by selectively applying appropriate neural networks for respective image regions included in a frame of a video based on a category of characteristics of spatial regions in which a plurality of neural networks are dedicatedly trained.

The processor 130 may transmit information on which neural network is applied to which spatial region. Through this, the video processing device 500 may be usefully applied to an image restoration and quality enhancement (IRQE) application in an user terminal which has a limited operation capability.

The video processing device 100 and the video processing device 500 may provide signaling between the transmission end and the reception end to negotiate a model update (a topology, an architecture, and a related weight) or a related model (for example, a neural network model) to be used with a video by the reception end (or, a client) and the transmission end (or, a server).

When a video to be processed or a neural network model corresponding to temporal portions of the video is not present in the video processing device 500, the processor 130 of the video processing device 100 may transmit information on the corresponding neural network model to the video processing device 500.

When a model is fine-tuned for a predetermined video, the processor 130 of the video processing device 100 may transmit a model to be applied to the entire video to the video processing device 500. When models are fined-tuned for different temporal portions of a video, the processor 130 of the video processing device 100 may transmit a model to be applied to a predetermined temporal portion and a video corresponding to the temporal portion to the video processing device 500.

If the video processing device 500 already has a global neural network (GNN) trained for an entirety of a predetermined video, the video processing device 100 may transmit residues between a model parameter (or, a weight parameter) of the GNN and a model parameter of a local neural network (LNN) to the video processing device 500.

The processor 130 may display an optimization target. For example, the processor 130 may use a uniform resource identifier (URI) which indicates a proper vocabulary.

The video processing device 100 may transmit information on which encoder and which encoding parameter was selected for video compression to the video processing device 500. The video processing device 100 may transmit one or more of values indicating a target error between original data and decoded data to the video processing device 500.

If a neural network is fine-tuned to different categories of image texture characteristics and the video processing device 500 already has the neural network, the video processing device 100 may transmit both of an identifier (ID) of the neural network model to be applied to spatial regions (or, split regions) of a frame and region splitting information for an IRQE application to the video processing device 500.

If a neural network is fine-tuned to different categories of image texture characteristics and the video processing device 500 does not have a model of the neural network, the model of the neural network may be transmitted to the video processing device 500.

The video processing device 100 may transmit a fine-tuned neural network for a video (or, content) and low-quality content together to a device. Here, the following four cases may be considered.

Case A may be a case in which a neural network is fine-tuned for an entire video. The video processing device 100 may transmit the neural network to the video processing device 500 before or during streaming the video. The video and the related neural network may be paired by a unique ID.

Case B may be a case in which a plurality of neural networks is optimized to diverse temporal portions of a video. Here, the video may be temporally split or split by other methods. The video processing device 100 may transmit the respective neural networks or corresponding differences between the neural networks to the video processing device 500 before or while streaming each portion of the video. Even in this case, each portion of the video, which is different from another, and a related neural network, may be paired.

Case C may be a case in which a plurality of neural networks is optimized respectively to categories of diverse characteristics of a video (or an image). The video processing device 100 may transmit a neural network model for a split region (or, an image region) and region splitting information of an image to the video processing device 500 before or while streaming the image.

Case D may be a case in which a plurality of neural network models are already available and being used for a target IRQE application in the reception end. The video processing device 100 may determine a neural network model to be optimally applied to each region of an image for IRQE and may transmit an ID of the neural network model to be applied to a split region (or an image region) and region splitting information of the image to the video processing device 500.

When a single neural network model is used for all content, the processor 130 of the video processing device 100 may transmit or update a neural network only once until a new version of the neural network becomes available. For example, the processor 130 may transmit or update a neural network once a month to/in the video processing device 500.

When a neural network model is fine-tuned for each predetermined video (or other content), the processor 130 of the video processing device 100 may newly transmit or update the neural network model for each of new videos. For example, the processor 130 may transmit or update the neural network model to/in the video processing device 500 multiple times per day.

When neural networks are fine-tuned for temporal portions of a predetermined video respectively, the processor 130 of the video processing device 100 may transmit neural network models for all temporal portions of the video to the video processing device 500. In this case, the processor 130 may transmit or update the neural network for all temporal portions of the video. For example, the processor 130 may transmit or update the neural networks every one to five minutes corresponding to temporal portions respectively to/in the video processing device 500.

When a plurality of neural networks are fine-tuned for diverse categories of video characteristics respectively and fine-tuned neural networks are already available in the reception end, the processor 130 of the video processing device 100 may transmit respective images (or frames) of temporal portions of a video to be transmitted and/or respective IDs of the neural networks for temporal portions, and/or only image splitting information to the video processing device 500.

A size of a neural network may range from few kilobytes to hundreds of megabytes. A bandwidth of a distribution channel may depend on the distribution channel. For example, the bandwidth may be a bandwidth of 2nd-generation (2G), 3G, 4G and 5G networks.

When a single model is used for all videos, as for an acceptable latency, a predetermined small latency may be acceptable, and a latency of seconds or minutes may also be acceptable. In case of a neural network which is fine-tuned for each content, a latency of approximately one second may be the maximum acceptable latency.

In case of a neural network which is fine-tuned for each temporal portion, the maximum acceptable latency may be very small, like a sampling period. For example, a latency for video streaming may be 3 milliseconds (1/10 of sampling period).

As described above, by processing an image by splitting a frame included in a video, the video processing device 100 may provide benefits to content retrieval and negotiation interfaces through standardized signaling of a neural network representation in an inter-operability aspect.

In addition, the video processing device 100 may provide a benefit to a media consuming device through a standardized neural network representation which is appropriate for an artificial intelligence (AI) capability.

Figure 4:
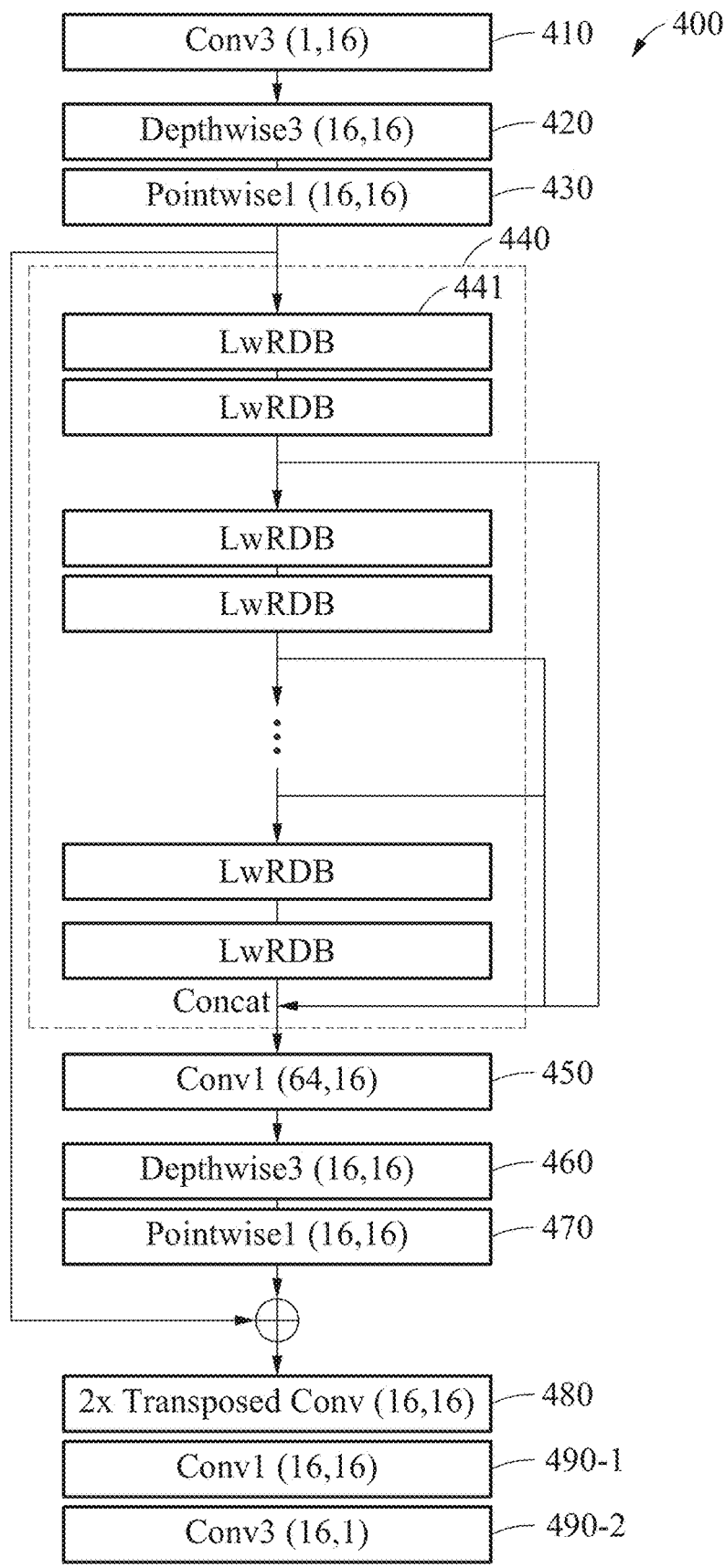
FIG. 4 illustrates an example of a structure of a neural network used by the transmission end and the reception end of the video processing device of FIG. 1.
Figure 5:
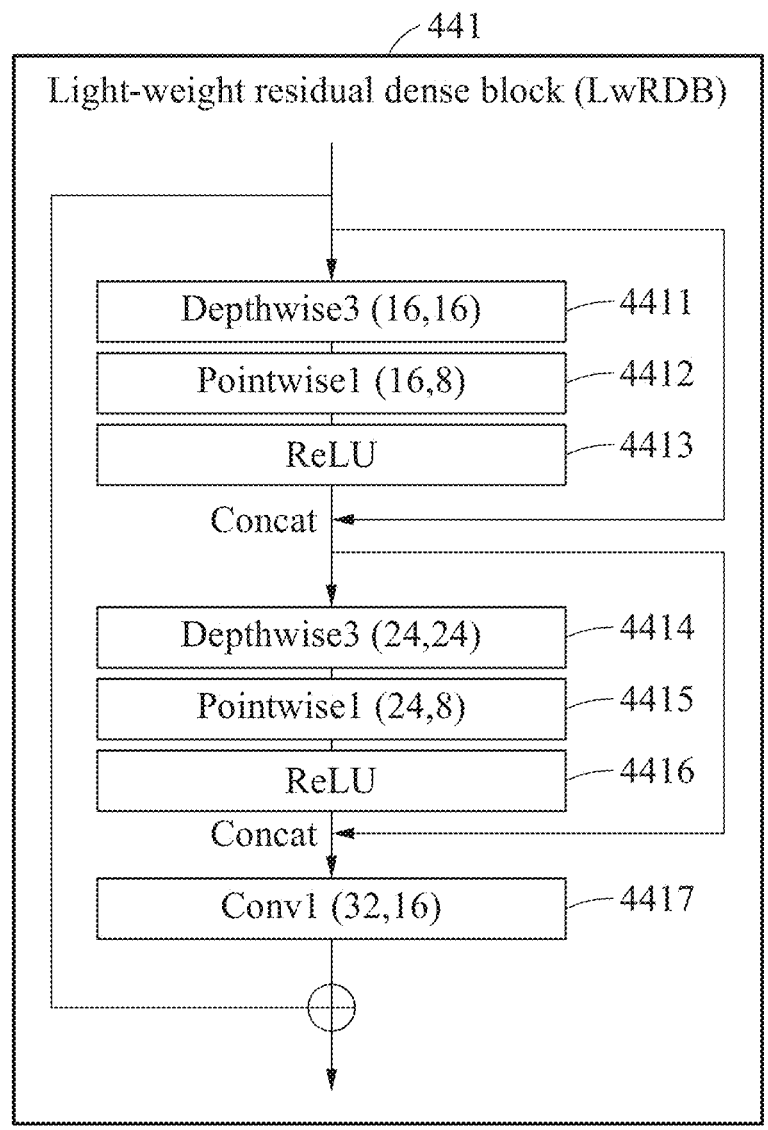
FIG. 5 illustrates an example of a structure of a lightweight residual dense block (LwRDB) of FIG. 4.

FIG. 4 illustrates an example of a structure of a neural network used by the video processing device 500 and the video processing device 100 of FIG. 1. FIG. 5 illustrates an example of a structure of a LwRDB of FIG. 4

Referring to FIGS. 4 and 5, the processor 130 of the video processing device 100 and the processor 500 of the video processing device 500 may process a video using the first neural network 210 and the second neural networks 230-1, 230-2, . . . , 230-n.

At least one of the first neural network 210 and the second neural networks 230-1, 230-2, . . . , 230-n may include a neural network 400 in a structure illustrated in FIG. 4. The neural network 400 may be referred to as a replicated light-weight residual dense-super resolution (RLRD-SR).

The neural network 400 may include a convolutional layer 410, a depth-wise convolutional layer 420, and a point-wise convolutional layer 430. The neural network 400 may include a set of LwRDBs 440, a convolutional layer 450, a depth-wise convolutional layer 460, and a point-wise convolutional layer 470.

In addition, the neural network 400 may include a transpose convolutional layer 480, a convolutional layer 490-1 and a convolutional layer 490-2.

The set of LwRDBs 440 may include one or more of LwRDBs 441. A plurality of LwRDBs 441 may be connected in a cascade structure. The processor 130 may perform video processing using a neural network configured in replicated LwRDBs 441.

The plurality of LwRDBs 441 may have shared parameters and may be connected in a cascade structure. By using N duplicated LwRDBs 441 having shared parameters, the processor 130 may enhance super-resolution performance without increasing a number of model parameters.

Each of the LwRDBs 441 may include three convolutional layers. The LwRDB 441 may include depth-wise separable convolutional layers to reduce training parameters for the first two layers and may include a 1×1 convolutional layer for the last layer.

Since the processor 130 may transmit residual weights only, weight compression efficiency may be enhanced by minimizing weights transmitted during training.

Figure 6:
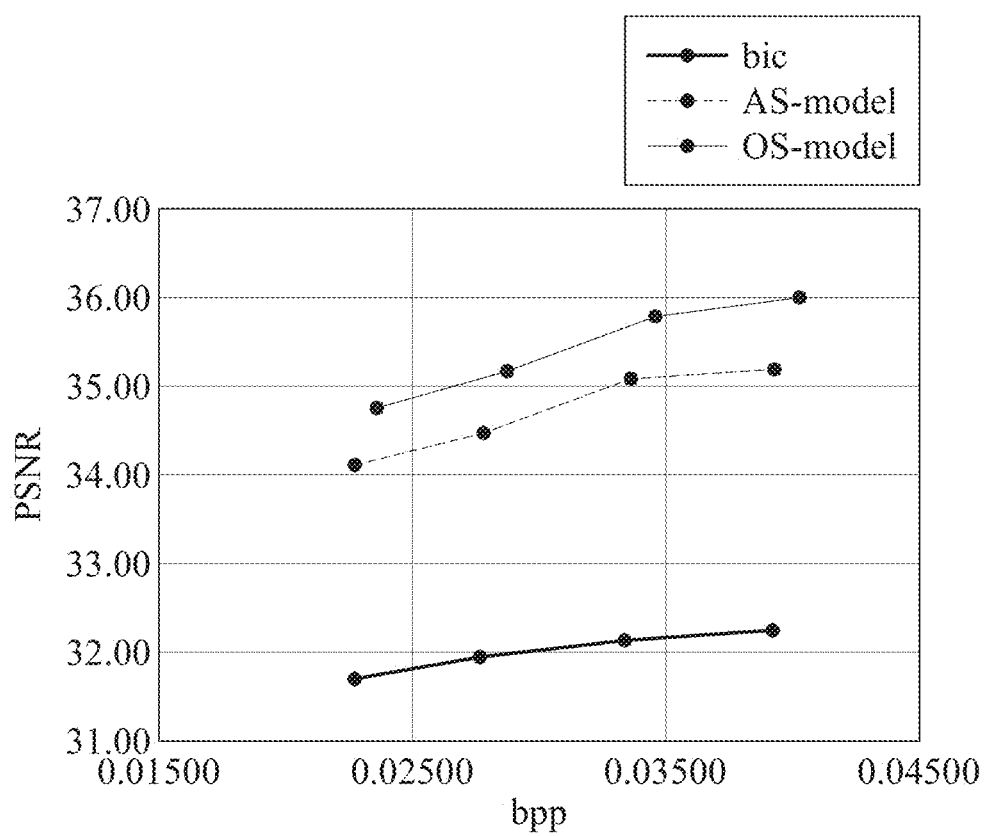
FIG. 6 illustrates peak signal-to-noise ratio (PSNR) according to the video processing method of FIG. 1.
Figure 7:
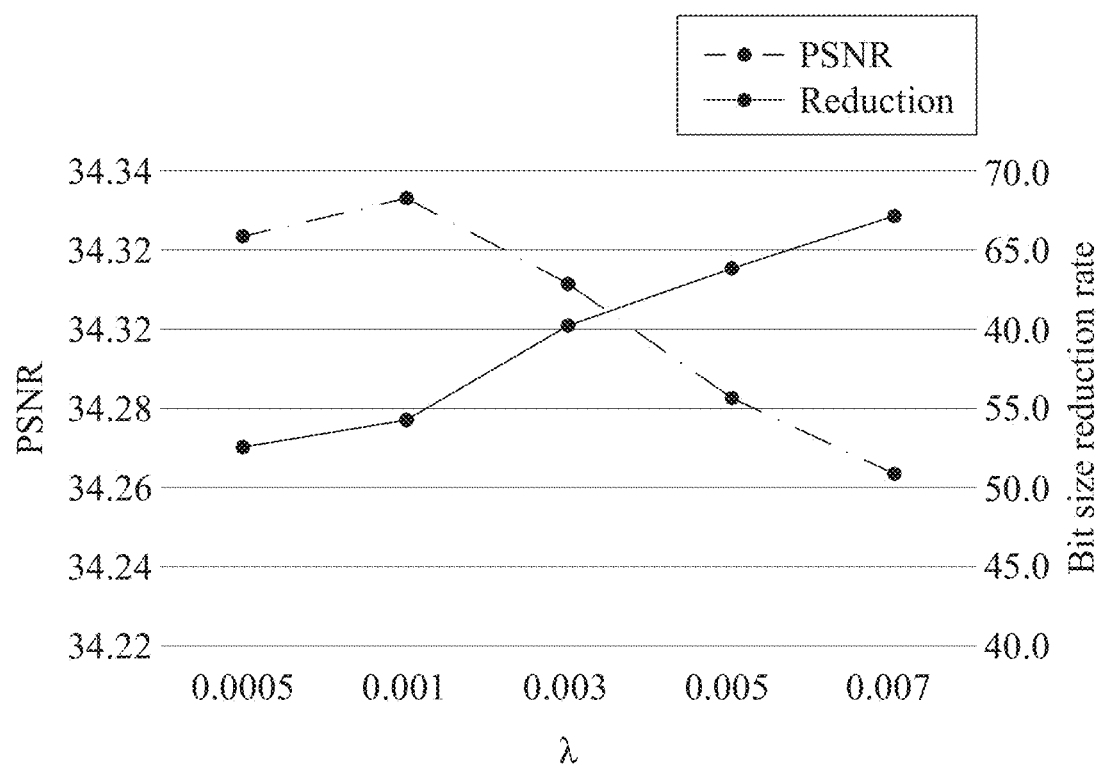
FIG. 7 illustrates reduction rates of PSNR and a bit size according to a hyperparameter.

FIG. 6 illustrates peak signal-to-noise ratio (PSNR) according to the video processing method of FIG. 1 and FIG. 7 illustrates reduction rates of PSNR and a bit size according to a hyperparameter.

Referring to FIGS. 6 and 7, a performance of the video processing device 100 may be measured through an experiment. The performance may be evaluated using a personal computer (PC) platform with 64-bit Windows 10™ OS, Intel i7-8700K 3.7 GHz CPU, 64 GRAM, Python 3.6, PyTorch 0.4.0, Cuda v9.0 and CUDNN 7.0.

Three super-resolution models may be used to compare performances. The three super-resolution models to be used may include an OS-model, an AS-model, and a bicubic interpolation corresponding to a scene in a video for upscaling the scene.

Table 1 may represent PSNR and bits per pixel (bpp) values for 10 scenes in a video when λ is set to 0.003, a number of centroids of K-means clustering is set to 1000 for the AS-model and to 300 for the OS-model.

TABLE 1

| | Bicubic Interpolation | | AS-model | | OS-model | |
|---|---|---|---|---|---|---|
| | PSNR | bpp | PSNR | bpp | PSNR | bpp |
| scene 1 | 32.97 | 0.0266 | 34.06 | 0.0267 | 34.31 | 0.0276 |
| scene 2 | 42.02 | 0.0234 | 42.63 | 0.0236 | 42.85 | 0.0244 |
| scene 3 | 35.95 | 0.0167 | 37.14 | 0.0168 | 37.45 | 0.0176 |
| scene 4 | 34.19 | 0.0260 | 35.19 | 0.0262 | 35.60 | 0.0270 |
| scene 5 | 40.27 | 0.0220 | 41.67 | 0.0221 | 41.93 | 0.0229 |
| scene 6 | 32.12 | 0.0334 | 35.04 | 0.0336 | 35.75 | 0.0346 |
| scene 7 | 23.66 | 0.0381 | 24.49 | 0.0383 | 24.62 | 0.0393 |
| scene 8 | 31.69 | 0.0120 | 32.25 | 0.0121 | 32.41 | 0.0130 |
| scene 9 | 30.13 | 0.0199 | 30.69 | 0.0201 | 30.76 | 0.0209 |
| scene 10 | 27.75 | 0.0179 | 27.92 | 0.0180 | 28.02 | 0.0189 |

The bpp (bppbic) of bicubic interpolation may be obtained by dividing bit size (bitvideo) of all frames of each scene encoded at 1200 kilobits per second (kbps) using HM16.17 by a height (H), a width (W) and a number (n) of frames of an upscaled video. That is, the bpp of bicubic interpolation may be calculated by Equation 4.

$$bpp_{bic} = \frac{bit_{video}}{W \times H \times n} \quad \text{[Equation 4]}$$

For calculating bpp (bppAS) for an AS-model, bits (bitAS) of trained parameters for an initial transmission may be additionally considered. A bit size of the AS-model may be divided by a number (S) of scenes to obtain a size assigned to one scene. The bpp of the AS-model may be calculated by Equation 5.

$$bpp_{AS} = \frac{bit_{video} + bit_{AS}/S}{W \times H \times n} \quad \text{[Equation 5]}$$

For calculating bpp (bppOS) of the OS-model, a residual parameter (bitOS-residual) trained for transmission may be considered. The bpp of the OS-model may be calculated by Equation 6.

$$bpp_{OS} = \frac{bit_{video} + bit_{AS}/S + bit_{OS-residual}}{W \times H \times n} \quad \text{[Equation 6]}$$

The graph of FIG. 6 may represent PSNR-bpp of bicubic interpolation, an AS-model and an OS-model. Referring to FIG. 6, it may be identified that the OS-model has approximately 3 dB higher PSNR than the bicubic interpolation and approximately 0.7 dB higher PSNR.

The graph of FIG. 7 may represent PSNR and weight compression performance for diverse λ values. As a λ value increases, higher training weight compression performance may be achieved, however, PSNR performance may be degraded. Thus, a λ value may need to be determined considering both of the weight compression performance and PSNR performance.

Figure 8:
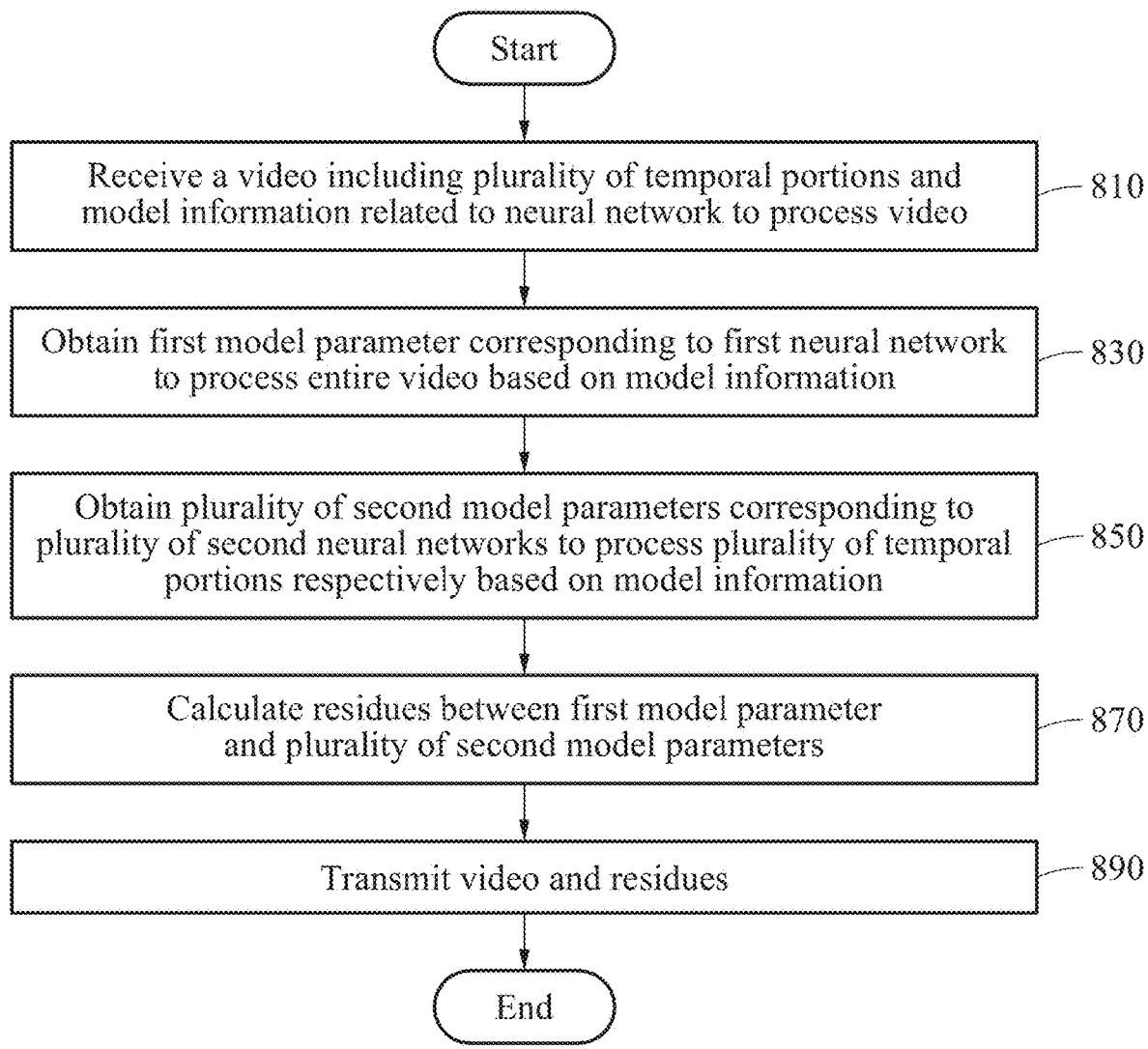
FIG. 8 illustrates a flow of operations of the transmission end of the video processing device of FIG. 1.

FIG. 8 illustrates a flow of operations of the transmission end of the image processing device of FIG. 1.

Referring to FIG. 8, in operation 810, the receiver 110 of the video processing device 100 may receive a video including a plurality of temporal portions and/or model information related to a neural network to process the video.

In operation 830, the processor 130 may obtain a first model parameter corresponding to a first neural network to process an entire video based on the model information.

In operation 850, the processor 130 may obtain a plurality of model parameters corresponding to a plurality of second neural networks to process the plurality of temporal portions respectively based on the model information.

In operation 870, the processor 130 may calculate residues between the first model parameter and the plurality of second model parameters.

In operation 890, the processor 130 may transmit the video and the residues.

The processor 130 may generate spatial region splitting information by splitting a frame included in the plurality of temporal portions. The processor 130 may generate category information on split spatial regions based on signal characteristics of the split spatial regions.

The processor 130 may compress and transmit at least one of the video, the residues between the first neural network and the plurality of second neural networks, the spatial region splitting information and the category information.

The processor 130 may train the plurality of second neural networks to minimize the residues.

At least one of the first neural network and the plurality of second neural networks may include a LwRDB including at least one convolutional layer. At least one of the first neural network and the plurality of second neural networks may include a plurality of LwRDBs configured in a cascade structure.

The LwRDB may include a depth-wise separable convolutional layer, or a 1×1×d convolutional layer. The depth-wise separable convolutional layer may include a depth-wise convolutional layer, a point-wise convolutional layer, and a nonlinear activation function.

Figure 9:
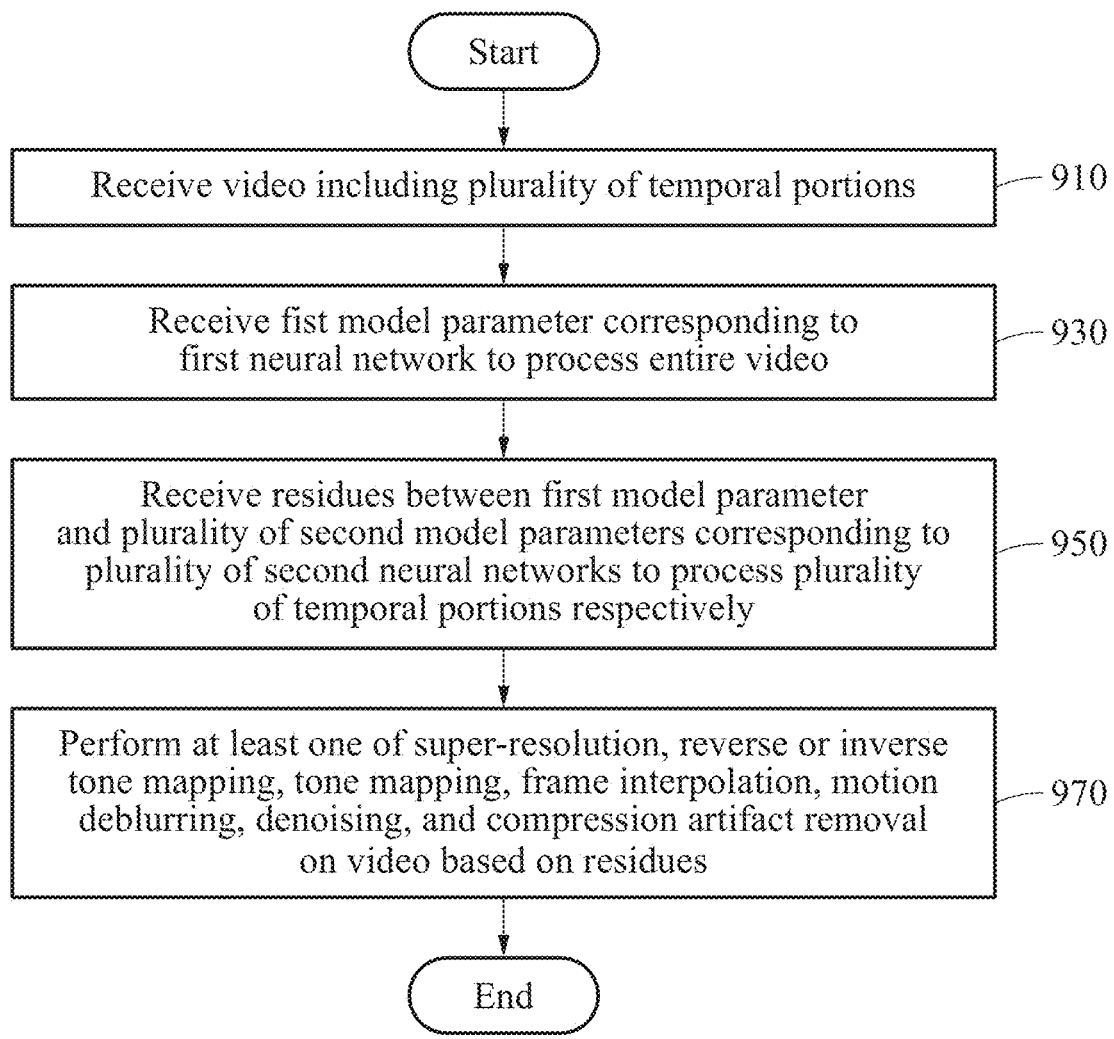
FIG. 9 illustrates a flow of operations of the reception end of the video processing device of FIG. 1.

FIG. 9 illustrates a flow of operations of the reception end of the video processing device of FIG. 1.

Referring to FIG. 9, in operation 910, the receiver 510 may receive a video including a plurality of temporal portions. In operation 930, the receiver 510 may receive a first model parameter corresponding to a first neural network to process an entire video.

In operation 950, the receiver 510 may receive residues between the first model parameter and a plurality of second model parameters corresponding to a plurality of second neural networks to process the plurality of temporal portions respectively.

The receiver 510 may receive spatial region splitting information on a frame included in the plurality of temporal portions and category information on split spatial regions. The spatial region splitting information and the category information may be the same as described above.

In operation 970, the processor 530 may perform at least one of super-resolution, reverse or inverse tone mapping, tone mapping, frame interpolation, motion deblurring, denoising, and compression artifact removal on the video based on the residues.

The processor 530 may restore the plurality of second model parameters by adding the residues to the first model parameter. The processor 530 may perform at least one of super-resolution, reverse or inverse tone mapping, tone mapping, frame interpolation, motion deblurring, denoising, and compression artifact removal on the plurality of temporal portions based on the plurality of second model parameters.

The processor 530 may split a frame into a plurality of spatial regions based on the spatial region splitting information and the category information.

The processor 530 may perform at least one of super-resolution, reverse or inverse tone mapping, tone mapping, frame interpolation, motion deblurring, denoising, and compression artifact removal on a video based on the plurality of spatial regions and the category information.

At least one of the first neural network and the plurality of second neural networks may include a LwRDB including at least one convolutional layer. At least one of the first neural network and the plurality of second neural networks may include a plurality of LwRDBs configured in a cascade structure.

The LwRDB may include a depth-wise separable convolutional layer, or a 1×1×d convolutional layer. The depth-wise separable convolutional layer may include a depth-wise convolutional layer, a point-wise convolutional layer, and a ReLU.

The methods according to the above-described example embodiments may be recorded in non-transitory computer-readable media including program instructions to implement various operations of the above-described example embodiments. The media may also include, alone or in combination with the program instructions, data files, data structures, and the like. The program instructions recorded on the media may be those specially designed and constructed for the purposes of example embodiments, or they may be of the kind well-known and available to those having skill in the computer software arts. Examples of non-transitory computer-readable media include magnetic media such as hard disks, floppy disks, and magnetic tape; optical media such as CD-ROM discs, DVDs, and/or Blue-ray discs; magneto-optical media such as optical discs; and hardware devices that are specially configured to store and perform program instructions, such as read-only memory (ROM), random access memory (RAM), flash memory (e.g., USB flash drives, memory cards, memory sticks, etc.), and the like. Examples of program instructions include both machine code, such as produced by a compiler, and files containing higher-level code that may be executed by the computer using an interpreter. The above-described devices may be configured to act as one or more software modules in order to perform the operations of the above-described example embodiments, or vice versa.

The software may include computer programs, codes, instructions, or some combination thereof, to independently or collectively instruct or configure the processing device to operate as desired. Software and data may be embodied permanently or temporarily in any type of machine, component, physical or pseudo equipment, computer storage medium or device, or in a propagated signal wave capable of providing instructions or data to or being interpreted by the processing device. The software also may be distributed over network-coupled computer systems so that the software is stored and executed in a distributed fashion. The software and data may be stored by one or more non-transitory computer-readable recording mediums.

A number of example embodiments have been described above. Nevertheless, it should be understood that various modifications may be made to these example embodiments. For example, suitable results may be achieved if the described techniques are performed in a different order and/or if components in a described system, architecture, device, or circuit are combined in a different manner and/or replaced or supplemented by other components or their equivalents.

Accordingly, other implementations are within the scope of the following claims.

The invention claimed is:

1. A video processing method comprising:
receiving a video comprising a plurality of temporal portions;
receiving a first model parameter set corresponding to a first neural network to process the video entirely wherein the first model parameter set includes a plurality of parameter values;
receiving residues between the first model parameter set and a plurality of second model parameter sets corresponding to a plurality of second neural networks each to process a different one of the plurality of temporal portions wherein each of the second model parameter sets includes a plurality of parameter values; and
performing at least one of super-resolution, reverse or inverse tone mapping, tone mapping, frame interpolation, motion deblurring, denoising, and compression artifact removal on the video using the residues.

2. The video processing method of claim 1, wherein at least one of the first neural network and the plurality of second neural networks comprises a light-weight residual dense block comprising at least one convolutional layer.

3. The video processing method of claim 1, wherein at least one of the first neural network and the plurality of second neural networks comprises a plurality of light-weight residual dense blocks configured in a cascade structure.

4. The video processing method of claim 2, wherein the light-weight residual dense block comprises:
a depth-wise separable convolutional layer; or
a 1×1×d convolutional layer.

5. The video processing method of claim 4, wherein the depth-wise separable convolutional layer comprises:
a depth-wise convolutional layer;
a point-wise convolutional layer; and
a nonlinear activation function.

6. The video processing method of claim 1, wherein the performing comprises:
restoring the plurality of second model parameter sets by adding the residues to the first model parameter set; and
performing at least one of super-resolution, reverse or inverse tone mapping, tone mapping, frame interpolation, motion deblurring, denoising and compression artifact removal on each of the plurality of temporal portions based on a respective one of the plurality of second model parameter sets restored from the residues and the first model parameter set.

7. The video processing method of claim 1, further comprising:
receiving spatial region splitting information on a frame comprised in the plurality of temporal portions and category information of split spatial regions.

8. The video processing method of claim 7, further comprising:
splitting the frame into a plurality of spatial regions based on the spatial region splitting information and the category information; and
performing at least one of super-resolution, reverse or inverse tone mapping, tone mapping, frame interpolation, motion deblurring, denoising, and compression artifact removal on the frame based on the plurality of spatial regions and the category information.

9. A video processing device comprising:
a receiver configured to receive a video comprising a plurality of temporal portions, receive a first model parameter set corresponding to a first neural network to process the video entirely wherein the first model parameter set includes a plurality of parameter values, and receive residues between the first model parameter set and a plurality of second model parameter sets corresponding to a plurality of second neural networks each to process a different ones of the plurality of temporal portions wherein each of the second model parameter sets includes a plurality of parameter values; and
a processor configured to perform at least one of super-resolution, reverse or inverse tone mapping, tone mapping, frame interpolation, motion deblurring, denoising, and compression artifact removal on the video using the residues.

10. The video processing device of claim 9, wherein at least one of the first neural network and the plurality of second neural networks comprises a light-weight residual dense block comprising at least one convolutional layer.

11. The video processing device of claim 9, wherein at least one of the first neural network and the plurality of second neural networks comprises a plurality of light-weight residual dense blocks configured in a cascade structure.

12. The video processing device of claim 10, wherein the light-weight residual dense block comprises:
a depth-wise separable convolutional layer; or
a 1×1×d convolutional layer.

13. The video processing device of claim 12, wherein the depth-wise separable convolutional layer comprises:
a depth-wise convolutional layer;
a point-wise convolutional layer; and
a nonlinear activation function.

14. The video processing device of claim 9, wherein the processor is configured to:
restore the plurality of second model parameter sets by adding the residues to the first model parameter set, and
perform at least one of super-resolution, reverse or inverse tone mapping, tone mapping, frame interpolation, motion deblurring, denoising and compression artifact removal on each of the plurality of temporal portions based on a respective one of the plurality of second model parameter sets restored from the residues and the first model parameter set.

15. The video processing device of claim 9, wherein the receiver is further configured to receive spatial region splitting information on a frame comprised in the plurality of temporal portions and category information of split spatial regions.

16. The video processing device of claim 15, wherein the processor is configured to:
split the frame into a plurality of spatial regions based on the spatial region splitting information and the category information, and
perform at least one of super-resolution, reverse or inverse tone mapping, tone mapping, frame interpolation, motion deblurring, denoising, and compression artifact removal on the frame based on the plurality of spatial regions and the category information.

17. A video processing method comprising:
receiving a video comprising a plurality of temporal portions and model information related to neural networks configured to process the video;
obtaining a first model parameter set corresponding to a first neural network to process the video entirely based on the model information wherein the first model parameter set includes a plurality of parameter values;
obtaining a plurality of second model parameter sets corresponding to a plurality of second neural networks each to process a different ones of the plurality of temporal portions based on the model information wherein each of the second model parameter sets includes a plurality of parameter values;
calculating residues between the first model parameter set and the plurality of second model parameter sets; and
transmitting the video and the residues;
wherein the processing by the first and plurality of second neural networks comprising performing at least one of super-resolution, reverse or inverse tone mapping, tone mapping, frame interpolation, motion deblurring, denoising, and compression artifact removal.

18. The video processing method of claim 17, further comprising:
generating spatial region splitting information by splitting a frame comprised in the plurality of temporal portions; and generating category information on the split spatial regions based on signal characteristics of the split spatial regions.

19. The video processing method of claim 18, wherein the transmitting comprises compressing and transmitting at least one of the video, the residues, the spatial region splitting information and the category information.

20. The video processing method of claim 17, further comprising:
training the plurality of second neural networks to minimize the residues.

21. A video processing device comprising:
a receiver configured to receive a video comprising a plurality of temporal portions and model information related to a neural network configured to process the video; and
a processor configured to obtain a first model parameter set corresponding to a first neural network to process the video entirely based on the model information wherein the first model parameter set includes a plurality of parameter values, obtain a plurality of second model parameter sets corresponding to a plurality of second neural networks each to process a different ones of the plurality of temporal portions based on the model information wherein each of the second model parameter sets includes a plurality of parameter values, calculate residues between the first model parameter set and the plurality of second model parameter sets, and transmit the video and the residues;
wherein the processing by the first and plurality of second neural networks comprising performing at least one of super-resolution, reverse or inverse tone mapping, tone mapping, frame interpolation, motion deblurring, denoising, and compression artifact removal.

22. The video processing device of claim 21, wherein the processor is configured to:
generate spatial region splitting information by splitting a frame comprised in the plurality of temporal portions, and
generate category information on split spatial regions based on signal characteristics of the split spatial regions.

23. The video processing device of claim 22, wherein the processor is configured to compress and transmit at least one of the video, the residues, the spatial region splitting information and the category information.

24. The video processing device of claim 21, wherein the processor is configured to train the plurality of second neural networks to minimize the residues.

* * * * *